United States Patent

Potter et al.

[11] Patent Number: 5,997,652
[45] Date of Patent: Dec. 7, 1999

[54] FOOD STARCH PROCESSING METHOD AND APPARATUS

[76] Inventors: J. Leon Potter; Gary L. Hensley, both of P.O. Box 2965, Houston, Tex. 77252

[21] Appl. No.: 09/099,166

[22] Filed: Jun. 18, 1998

[51] Int. Cl.[6] .................................................. C08B 30/04

[52] U.S. Cl. .................................. 127/9; 127/24; 127/55; 127/69; 210/134; 210/259; 210/295; 210/323.2; 210/739; 210/787; 210/805; 210/806

[58] Field of Search .................................... 127/9, 24, 55, 127/69; 210/259, 295, 323.2, 739, 787, 805, 806, 134

[56] References Cited

U.S. PATENT DOCUMENTS

| | | | |
|---|---|---|---|
| 3,843,406 | 10/1974 | Wright et al. | 127/69 |
| 4,412,867 | 11/1983 | Cicuttini | 127/69 |
| 4,994,115 | 2/1991 | Giesfeldt et al. | 127/69 |
| 5,277,827 | 1/1994 | Osborne | 210/787 |

*Primary Examiner*—David Brunsman
*Attorney, Agent, or Firm*—Gunn & Associates, P.C.

[57] ABSTRACT

A food starch seperator comprising a serially connected centrifuge and a membrane seperator further comprising a sintered pipe providing pore flow paths including a pumped source of food plant liquor, outputs for the centrifuge and membrane seperator and a control system to regulate the flow of the food plant liquor.

16 Claims, 3 Drawing Sheets

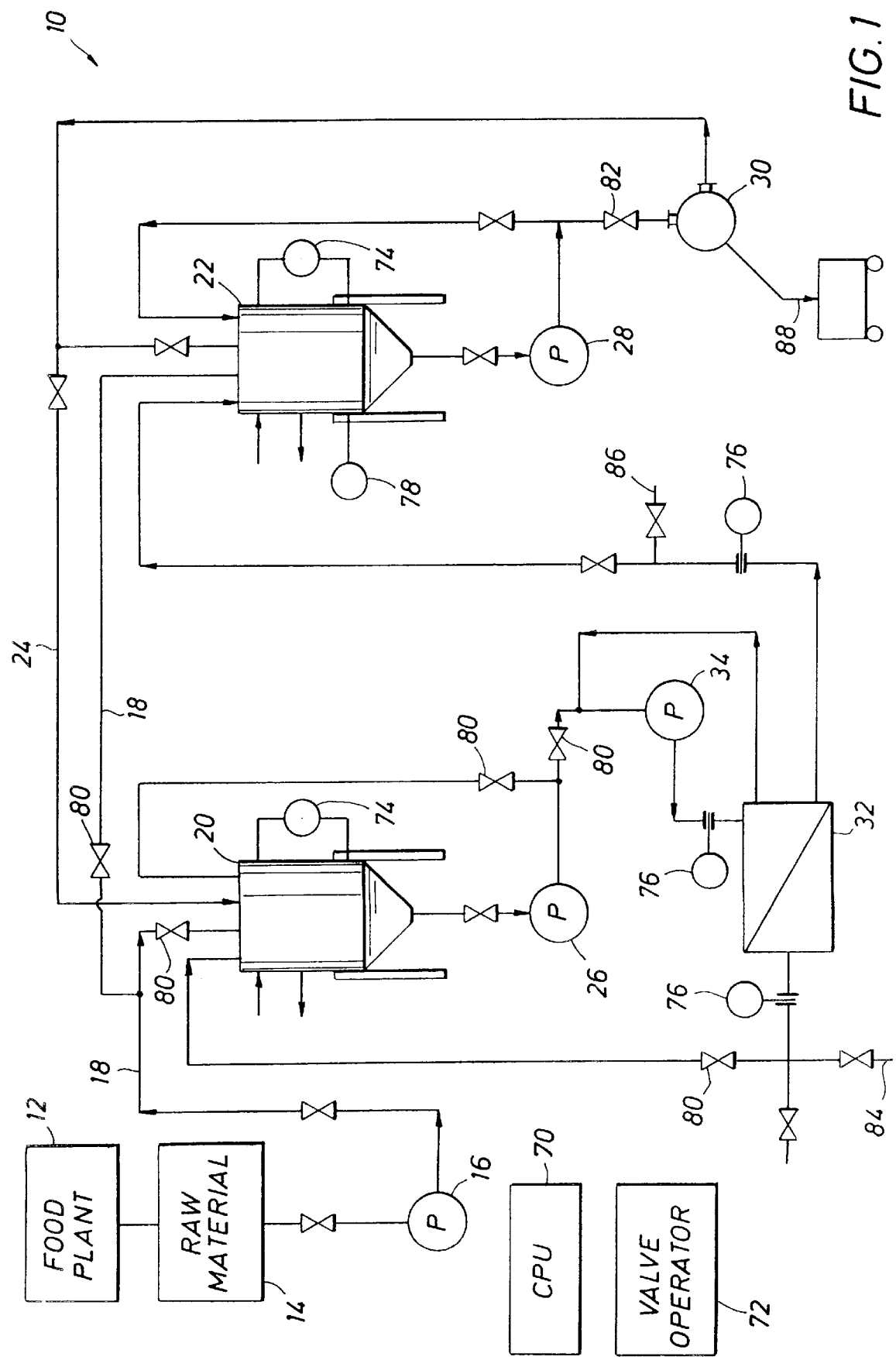

FIG. 3
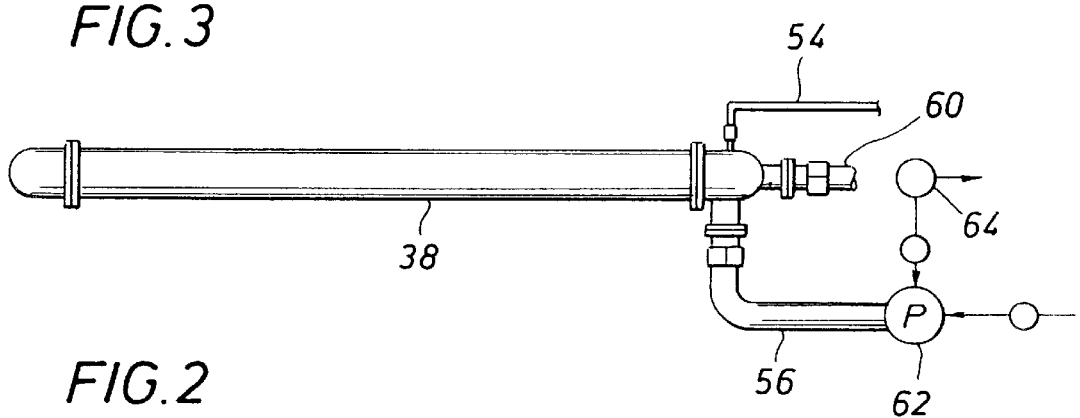
FIG. 2
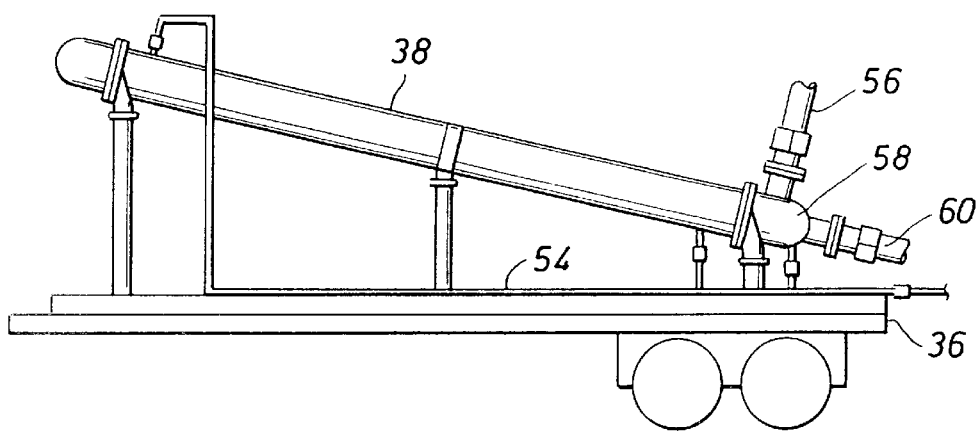
FIG. 4
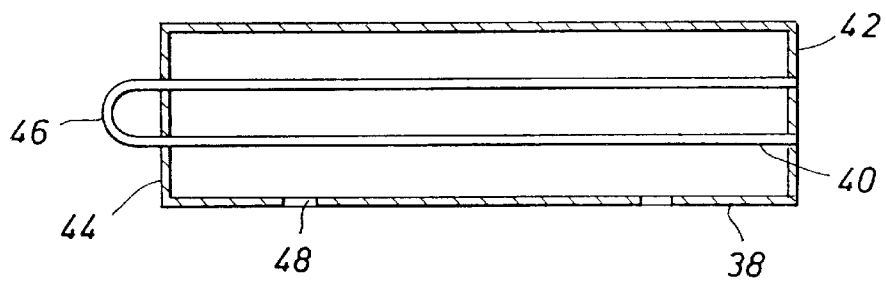
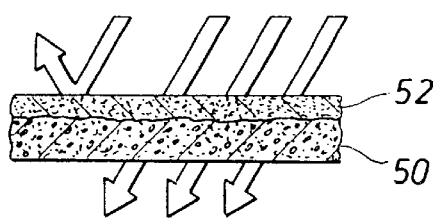
FIG. 5

FOOD STARCH PROCESSING METHOD AND APPARATUS

BACKGROUND OF THE DISCLOSURE

Many food products are simply harvested and shipped directly to the consumer. This is common for fruit (pears, peaches, apples, grapes and so on) and it is also common for many vegetables. However, more and more benefits are obtained by processing harvested foods so that extracts are obtained from the foods. In the extraction process, the food is typically processed either by grinding or by preliminary cooking. In the first instance, many apples are crushed to extract the apple cider, and the pulp is subsequently processed for various derivatives sold in the market as apple butter, apple jelly, and the like. It is not uncommon to process potatoes to form similar products also. They typically are reconstituted in the form of extruded potato chips, french fries and other shapes and forms. It is also common to process a large number of grain crops. This typically requires some measure of processing to remove the husk or other parts of the plant which do not require processing. Thereafter, the kernel is processed typically by cooking to soften the kernel. To be sure, there is food value in an ear of corn, but it is generally hard and relatively unpalatable to the taste of most. Rather, the corn is at least separated from the shuck, and the kernels are removed from the corn cob. Thereafter, they may be processed by any number of subsequent cooking procedures. By crushing, corn starch can be derived. By appropriate pre-treatment and subsequent cooking, the corn can be converted by the hominy. The foregoing is also true of rice in that it has to separated from the husk and subsequently cooked.

In many of these procedures, whether cooking with elevated temperature or processing in other fashions, there is a waste discharge. The waste discharge is a water stream which carries in it some pulp from the processed fruit, vegetables and grain so that the treatment throws away a portion of the unconverted feed (the picked and ready to treat fruit, vegetable or grain).

The waste steam from a food processing plant is very difficult to treat downstream in a sewage system. It creates a tremendous oxygen demand. Ordinarily, food treatment plants have to pay a premium to dispose of this waste stream. The suspended particles or the sugars and starches in the solution pose a great burden on the treatment plant. As a practical matter, they also carry away a significant portion of the value in the feed materials. In a large plant, handling thousands of pounds per hour, this can be a various substantial discharge. More importantly, this discharge has additional utility costs in that it often is in the form of a water solution at substantial temperatures. Clearly, there is value to be obtained in extracting a substantial portion of the sugars and starches which are carried in the waste stream.

Take as an example a rice processing plant. The husk or hull is salvaged. It is obtained in a dry state. The next step of treatment involves cooking the rice. It is cooked in water and subsequently separated from that water. The water stream includes a very significant portion of starch or sugar derivatives. These are normally carried in suspension although a portion of it will dissolve into the water. It leaves a very difficult waste stream to handle. It is difficult to separate out any sediment in light of the volume is handled. Through the use of settling tanks, some portions can be removed, but the bulk of the food components remain suspended or dissolved in the waste water stream. The waste water is typically delivered at an elevated temperature. That tends to increase the amount entering into solution. Even where cooled to ambient temperature the waste stream is not easily segregated into a solid component retrieved from the segregated liquid component. By attempting to break the waste stream into the two components, some measure of improvement in the waste water post treatment steps can be obtained but it is a difficult chore to make this kind of separation.

The present disclosure sets out a method and apparatus for improved and enhanced treatment of food processing plant streams. It is particularly intended for use with those plants processing grains, fruit and vegetables. It is especially effective in the treatment of heated waste streams which are laden with bits of pulp, shredded skin (as would occur in an apple processing plant) and can recover components of substantial value. An example will be given below referring to a rice processing plant. The plant cooks the rice in water for a specified interval at elevated temperatures and then continues to treat the rice kernel after removing the kernel from the hot water. The hot water stream (otherwise a waste product stream) is input to a system for improving the post cooking treatment of the spent hot liquor using that term to apply to the waste water laden with pieces of the grain, fruit or vegetable either in solution or in suspension or both. The waste stream is delivered to a processing plant in which the water is extracted for easy disposal. The stream of water after treatment places minor demands on the sewage system. This water is clarified and otherwise stripped of the derivatives from the fruit, vegetable or grain treated in the plant. Collectively, the input will be termed the "liquor" and the liquor is broken down into two components by the treatment process and is discharged as the clarified solvent (practically always water) while the recovered components will be described generally as the extract. The extract is comprised of some pulp from the liquor and includes a significant portion of starches and sugars.

Within this context, the present method and apparatus are summarized as a disposal system for food processing plant to handle the discharged liquor from the process. This stream which is otherwise wasted includes the solvent and relatively valuable food components which are recovered. This recovery approach uses a combination membrane filtration in conjunction with centrifuge separation. Interestingly, it has been found that the recovery is markedly enhanced by combining the two procedures in conjunction with a feedback flow so that reprocessing is carried out in a continuous fashion, and the achieved results are controllably executed in a combined system. With appropriate pumps, flow tanks and measuring instruments, a control system is implemented so that the flow of the food plant liquor is appropriately processed to make this valuable recovery. Better than that, the discharged water from this process is more easily disposed, and is not laden with the excessive food plant components which otherwise have such a high oxygen demand in subsequent processing as sewage.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a schematic block diagram of a food plant in accordance with the teachings of present disclosure incorporating an input pump connected with a membrane separator operating with a disk centrifuge and incorporating a feedback flow path;

FIG. 2 is a side view of a membrane separator having the form of an elongate bundle of pipes in a collection sleeve mounted on a trailer;

FIG. 3 is a view of the truck mounted equipment shown in FIG. 2 showing connections for that equipment;

FIG. 4 is a simplified view of a single membrane pipe in the apparatus shown in FIG. 2;

FIG. 5 is a sectional view through the wall of the membrane showing how the membrane segregates the solvent from the particles in the solvent.

DETAILED DESCRIPTION OF THE PREFERRED EMBODIMENTS

Figure 6:
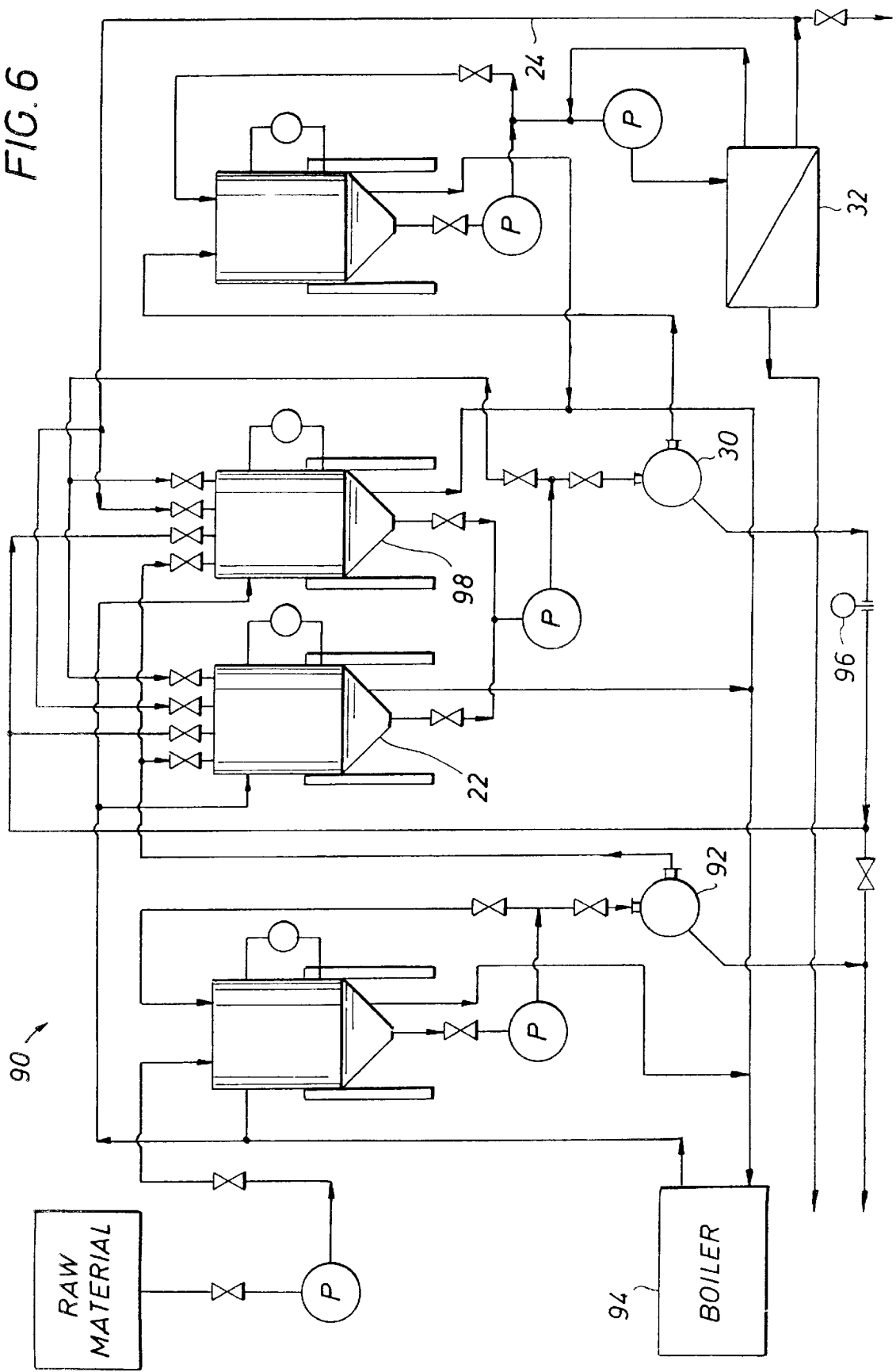
FIG. 6 is an alternate multiple stage centrifuge arrangement in conjunction with a membrane separator to provide a more expensive processing system which is similar to that of FIG. 1.

Attention is directed to FIG. 1 of the drawing where the numeral 10 identifies the present apparatus. It is connected to a food plant 12 which delivers a flow of liquor to a tank 14. The tank 14 receives and stores a portion of the liquor to smooth out irregularities in flow. Effectively, it is a surge pond. Ideally, the dwell time in the tank is relatively short. Otherwise, heat will be lost. It may be desirable to insulate the tank so that heat loss does not occur. The tank is connected through an output valve and then to a pump 16. The pump 16 delivers through a feed line 18 into a tank 20 or an alternate tank 22. The line 18 will be described as the input line while line 24 is the feedback line. The cooperation of the feedback line with the tanks and other components will be noted in some detail. The tank 20 has an output connected with a pump 26 and a comparable pump 28 delivers the output of the tank 22. These two tanks, associated pumps, and other lines deliver the liquor for process through a disk centrifuge 30 and a membrane separator 32. The membrane separator is provided with a recirculation pump 34. The operation of this pump will be more readily understood in conjunction with detailed drawings of the membrane separator 32.

OVERVIEW OF THE MEMBRANE SEPARATOR AND DISK CENTRIFUGE FEEDBACK SYSTEM

Focusing solely on FIG. 1, the system incorporates a method of processing which delivers the feed in the line 18 to the tank 20. Below, a description will be given where the feed line 18 is input to the tank 22. The two are equally available approaches. In general terms, if the tank 20 receives the input, the first processing step is through the membrane separator 32. In the other situation the feed is input to the tank 22 and therefore is input to the centrifuge 30. Under the assumption that the feed is input to the tank 20, it is delivered under pressure by the lines which are connected to fill the tanks 20 and 22. Both tanks are similar in that they are equipped with level controllers. Both tanks are also preferably heated. Conveniently, heat can be provided with a heat exchanger or they can also be provided with a steam heated jacket which is connected to a suitable source of steam. For both tanks, the pumps 26 and 28 remove the accumulated tank stored liquor. Optionally, each tank is equipped with a feedback line from the pump back into the tank to continue stirring the liquor in the tank. In both instances however, the tanks are output through the pumps as illustrated and the pumps deliver the pressure boosted flow input to the membrane separator 32 and the disk centrifuge 30.

The membrane separator 32 flows the liquor through an elongate tubular membrane. In the preferred form, the membrane is provided with pores through the wall of the membrane. It is preferably made of sintered stainless steel particles which are compacted to define the thickness of the wall. For instance, it resembles a pipe but has a wall thickness of about one quarter inch for a typical pipe. The liquor is directed through the interior of the pipe and flows at a specified velocity. Examples are given below. The sintered particles define a plurality of small pores which flow the solvent through the wall. The solvent (water in practically every instance) flows through the small pores. The pores are micron size. Collectively, the pores describe a specified or mean pore diameter. The pore diameter can be specified to 100 microns, 10 microns, 1 micron, and even smaller if desired. The pore diameter is selected so that the pores will pass the solvent. This means that the water molecule is sufficiently small that it can flow through the pores. The molecules of the other materials in the liquor are larger and sufficiently large that they do not readily pass through the pores. Generally, solutions involving molecules that are sufficiently small will pass through the pores. Particles and molecules above a certain size will not pass through the pores in the membrane. Several examples are give below.

The membrane separator is constructed and arranged so that the pores reject large molecules and particles. For instance, food pulp particles are so large that they will not pass through the pores. The membrane separator takes advantage of this. As the liquor flows through the membrane separator having the form of a porous wall tube (details are set forth below), the water weeps through the wall and collects on the outside of the membrane tube. It is then easily removed. This increases the concentration of the liquor flowing through the membrane tube.

The membrane concentrate discharge is directed to the tank 22. It is ultimately input under pressure by the pump 28 to the disk centrifuge 30. The disk centrifuge 30 separates the liquor into two streams. Just as the membrane separator provided this separation, the centrifuge also provides this separation. Without being categorical about the matter, the centrifuge makes a separation based on weight which in this specific instance assists in segregation of the valuable components from the solvent. More specifically, the weight material in the liquor is extracted and removed. It is removed for subsequent use because it has great value. By contrast, the membrane removes the water which is a relatively small and light weight molecule. It is light weight in the sense that the liquor is a mix of components, some in solution, and some in suspension in the water. So, the membrane 32 removes water making a more highly concentrated liquor which is then cycled through the centrifuge to remove the heavier components i.e. those that are separated by centrifical forces. The enhanced recovery will be developed in some detail below.

Attention is now directed to a representative situation to show the difference in the outputs of the membrane separator 32 as well the disk centrifuge 30. Assume that the feed is derived from processing rice and comprises a flow of hot water perhaps 175° F., dissolved starch i.e. starch and related compounds which have entered into solution, suspensions of starch molecules which effectively become medium size or perhaps even larger molecules held in suspension, typically having substantial bonds to hydrate complexes i.e. water, and larger particles which are chips or dust from the husk, kernel, and other protein or fiber based components in the rice. Interestingly, all of the components which are carried in the liquor are not notably dense. Moreover, because they comprise fibrous materials and are distinctly open celled, there will be a substantial hydrate component. In other words, even in what is dry state at room temperature, there is a substantial quantity of water in kernels and other rice related components. Suffice it to say, the rice is mixed with water at elevated temperature and holds a substantial portion of water as a hydrate in the structure. After the water is absorbed and yet after the processing has continued for an interval, the liquor is delivered to the system. Important aspects of the operation include the segregation of the liquor into extracted water which is significantly free of the starches and rice related components. Another discharge is a stream of moist particulate material, perhaps more in the form of a slurry which makes up the heavier components. By appropriate and careful adjustment of the set points for operation of the system, a significant portion can be extracted wherein starch and starch related products comprise a gelatinous mass of a semi-solid consistency. It has significant and great value. The discharge of water with reduced oxygen demand in disposal is note worthy. In effect, the water is ready to be thrown away and has trivial value, but at least it is more or less easily disposed of without substantial sewage cost and premiums in disposal. Finally, the gelatinous mass which is discharged has great value because it can be recycled in a number of ways, for example, by addition to cattle feed and the like. It is also quite suitable for human consumption and can be added as a stiffening agent to other food stuffs. A number of benefits of this will be noted below on review of the extraction apparatus considered in greater detail.

MEMBRANE EXTRACTION EQUIPMENT

To enhance an understanding of this system, particular emphasis is placed on the nature of the equipment and the different types of separations that are accomplished. It would be understood that the various types of separations accomplished here collectively provide an output stream of relatively pure solvent, or water. Again, other solvents can be cleaned just as readily; if the solvent can be retrieved, then it can be recycled or easily wasted. Otherwise, if the stream had to be disposed of, the cost would go down significantly.

The description below focus in part on the membrane separator. That will then be correlated to the centrifuge separators. For emphasis, the membrane separator will be discussed before the centrifuge separators so that the contrast between the two can be comprehended. More particularly, the membrane separator is located downstream so that it works the separation of the lightest particles of trash found in the liquor. This kind of separation is relatively challenging. More noting the challenge is given below. Directing attention now to FIG. 2 of the drawings, the membrane separator 32 is shown for mobile application where it is mounted on a trailer 36 which is towed to a field location and then left. A fixed plant can omit the trailer. The membrane separator comprises a plurality of U-shaped tubes in a surrounding housing or jacket. The jacket captures the clarified discharged solvent. For a better understanding of this, attention is diverted momentarily to FIG. 4 of the drawings. There, the jacket 38 is shown enclosing a U-shaped membrane tube 40. The jacket connects to a header plate 42 at one end and a comparable header 44 at the opposite end. The membrane tube 40 connects with a U-shaped bend 46 at the remote end. The bend 46 is typically made of a nonporous metal such as stainless steel. Generally, that is chemically inert and is not impacted by any fluid flowing through the system. The headers 42 and 44 are included to align a nest of tubes. All the tubes in the nest are made of porous membrane material. There may be several hundred linear segments inside the jacket 38 that serves as a collection vessel. In the collection vessel, the filtrate which is clarified by the membrane flows through the wall. It is permitted to drip or flow out through the openings 48 at spaced locations. In very general terms, the laden plant liquor is pumped into the U-shaped tube 40 and flows along the tube. The length of the tube is materially shortened by folding it into the two illustrated parts. As will be understood, and through the use of appropriate bends 46 at both of the headers, a serpentine flow path of 2, 4, 6 . . . or more segments is constructed. Assume for example that the feed flows through 20 membrane tubes segments. In this flow path, the flowing solvent has the opportunity to pass through the wall of the membrane tube. It drips downwardly and flows out through the drain 48 in the jacket. The jacket 38 is thus formed of a non permeable material, and is provided with multiple drain ports or openings 48 to remove the discharged filtrate.

The membrane which defines the tube 40 is specially constructed. In general terms, it is made with two layers. The wall is made from stainless steel particles which were packed to a particular shape and then joined together by sintering. When sintered, this forms a porous membrane. The pores in the membrane have a specified median diameter. The interior surface is smoothed somewhat by placing a second coating over it. Going to FIG. 5 of the drawings, the sintered stainless steel particles 50 comprise the greater portion of the wall thickness. A thin layer of $TiO_2$ powder is placed on the inside surface and likewise sintered to form the layer 52. It provides a more smooth surface and defines the typical or average pore diameter. In this particular instance, the pore diameter for this embodiment is about 0.1 micron. This provides a porous barrier which is able to pass solvent molecules. Solid particles in the liquor are not passed. Large molecules are passed or rejected depending on the size of the molecules. The solvent passes readily through the membrane, the solvent typically being water. Sugars and salts which are dissolved in the solvent typically will also pass through the membrane. As it flows through, it leaves a more and more strong concentration of the light weight particles which remain after the centrifuged removal. This will be defined as the membrane concentrate. In effect, it is all the pulp or solids that remains in the flow. This forms the discharge stream from the separation.

Coming back now to FIG. 2 of the drawings, it will be observed that the jacket 38 is inclined at an angle. It is equipped with a collection line 54 which is connected to one or more drain points along the jacket 38. By appropriate connection, an input line 56 is provided for the system. It connects to the end located manifold 58. The manifold 58 also houses the connections for the outlet line 60. The input is delivered into the manifold so that flow is directed into numerous U-shaped membrane tubes exemplified in FIG. 4. They are serially or parallel connected as needed in the manifold 58. The cross sectional flow path for the inlet line 56 is approximately matched by the aggregate cross sectional flow path of the membrane tubes 40. In other words, it is not necessary to restrict flow with the membrane tube 40. Indeed, relatively smooth laminar flow through the membrane tube 40 is generally desirable.

Pressure drop across the membrane tube is relatively nominal. It is desirable that the flow rate be kept to specified velocity. A change in flow rate changes the manner in which the concentrate tends to blind the membrane. The membrane is collectively an elongate filter surface. It is a filter surface which runs the risk of blinding. Preferably, the concentrate is pumped at a specified at a minimum velocity, and even greater velocities are achieved. This suggests a flow velocity at least above about 14 feet per second velocity along the membrane tube. If insufficient filtration is accomplished, then the tube 40 is simply made longer. That can be done by arranging more tubes in series. As exemplified in FIG. 4, there are two tubes in series. This can be extended to 4, 6, 8 and so on. By arranging the tubes in that fashion, the number of passes through the membrane tubes is increased so that the optimum amount of solvent is retrieved from the concentrate. After all, the concentrate represents the food stuffs. It is that portion which is later used i.e. appropriate conversion techniques must be applied to it. Moreover the flowing concentrate is kept at a adequate velocity to assure that the concentrate does not simply settle against the wall or the tube 40 and thereby blind the tube.

Going now to FIG. 3 of the drawings, the external jacket 38 is again shown. The inlet line 56 is also shown in conjunction with a pump 62. The pump 62 assures that there is an adequate velocity through the membrane tube 40. The outlet line 60 is input to a valve 64. Some portion of the concentrate is controllably returned to the inlet line 56. This enables continuous recycling of the concentrate stream so that appropriate filtering is carried out. The valve 64 divides the outlet, thereby providing a discharge at one branch and a portion for feedback at the other branch.

Notable operating perameters include the velocity, pressure and temperature of the fluid system undergoing treatment. The flow velocity is typically kept between about 14 and 16 feet per second in the membrane tube 40. The temperature is typically set between 180° F. and 200° F. The input pressure to the membrane tube is in the range of about 150 to 250 psi. Where the solvent is water, the set points are adjusted and the velocity is typically in the range of about 14 to 17 feet per second, the temperature is between about 140 and 180 degrees, and the pressure input to the membrane tube 40 is about 200 psi. In all instances, the input pressure is kept sufficiently high and the velocity is also kept sufficiently high that the concentrate stream discharge rate is relatively high, i.e., a drop in flow velocity is generally avoided.

DISK CENTRIFUGE EXTRACTION

The disk centrifuge extractor 30 comprises a system having a set of parallel plates which rotate in a pond. By imposing a number of tapered disks in the pond, the disk is able to provide a relatively large surface area pond of relatively shallow depth. Pond depth is related to the transit time. When a heavier particle is introduced on the top of the pond, it must traverse the depth of the pond. It is moved along the bottom of the pond by scrolling action of a conveyor screw operating in the conveyor. A representative disk centrifuge is shown in literature of several manufactures. The heavier particles are forced toward the bottom of the pond with extreme forces applied to the heavier particles during centrifical operation. The centrifical forces are 1000 times greater than the force of gravity, and can even be pushed as high as about 2000 or greater. The particles react to this force by settling to the bottom of the pond and migrating at urging of the screw conveyor to emerge from the disk centrifuge at the beach end of the conveyor. This dumps the heavier particles out of the centrifuge in a significantly dry status. While not dry completely, they from a relatively dry slurry which is significantly free of water. To be sure, some of the water is bound in the solid particles as for example by wetting the cellulose that makes up the food stuff. Pulp and other food related components will typically be removed at this stage.

To summarize, and going back now to FIG. 1 of the drawings, the system 10 delivers components where the gradation between water and starch based food stuffs and heavier pulp can be adjusted. The water can be disposed of as previously noted, the pulp and other components at the heavy end form a slurry of value, and the starchy gelatinous mass has significant value. Coming back to FIG. 1 of the drawings, flow in the system is thus controlled in the following manner. A CPU 70 is included for operation of one or several valve operators 72. The CPU is used to control the operation of the system. First, each of the tanks 20 is provided with a level controller 74. These duplicate controllers enable measurement of the volume of the tanks. By appropriate measurement of the fluid level and by using the CPU 70 to control both the fluid level and amount of steam delivered to the tanks, the flow output is carefully monitored and controlled in both volume and temperature. This can be used to operate the output pumps 26 and 28.

Proper operation of the equipment shown in FIG. 1 is enhanced by installing pressure meters 76 at respective illustrated locations. In general terms, the pressure meters help the operation because they measure the pressure and indirectly control the flow rates. The pumps 26 and 28 are operated to achieve the set point pressures. The membrane separator 32 operates with a selected pressure. The pressure meters 76 are located in the system to assure system control. Likewise, a thermostat 78 is included in the tank 22. This can be duplicated in other locations. All the sensors 74, 76 and 78 connect to the CPU to assure input of data sufficient to make the necessary measurements and output needed control signals.

The outlets of the system 10 shown in FIG. 1 include three outlets. Flows to these outlets are controlled by a number of valves. There are several valves 80 at various locations. In general terms, the valves 80 are opened are closed. It is possible to install and operate valves that are modulated. However, that makes the controller somewhat more complicated. Control is generally implemented by control of the pump speeds. The pumps 26 and 28 are thus operated at appropriate adjustable speeds to obtain the desired pressure ratings at various locations in the system. These pump speeds are carefully selected so that the appropriate pressures downstream are obtained. The valves 80 are adjusted to switch different operational aspects. To pick an easy example, the line 18 is the feed line while the line 24 is the feedback line. The line 24 is selectively controlled so that the feedback is delivered either to the tank 20 or the tank 22. Valves are operated so that the feed line 18 inputs to the first of the second tank. By appropriate switching of these two, suitable control is obtained. Likewise, the valves are adjusted to enable the return lines around the tanks 20 and 22. This may be necessary to recycle and continuously stir the material in the tanks 20 and 22. In general terms, the valves 80 are simply on/off valves as noted. The valve 82 however is an adjustable valve. It selects the proportion of feed which is input to the disk centrifuge. This assures that the centrifuge is not flooded. When flooding occurs, an excess of liquid is observed in the feedback line 24. The percent or quantity of solids which are segregated may well suffer from flooding.

The system operates with a liquid or clarified water outlet 84. A concentrate outlet line 86 is likewise provided. The centrifuge 30 has an outlet line for solids which are delivered to the outlet 88. If desired, the outlet 86 can be closed off so that only solids are delivered through the line 88 and clarified water is delivered through the line 84.

There are two important aspects to operation of this system. First is determining the advisability of inputting the feed to the tank 20 or the tank 22. This selects the first stage for operation of the feedback loop that is involved. Once the system is connected in a feedback mode by delivering through the input line and recycling a significant portion of the feed, that being done through the feedback line 24, the system then operates in a continuous fashion.

Set points are appropriately implemented under computer control. The set points thereby determine the degree of separation and the amount of recycling that occurs through the feedback system. In effect, liquid is obtained from the liquid outlet which is primarily water. It is water which has been stripped of most of the valuable starch by products from the process. These in turn are delivered at the selected outlet. In general terms, that is the outlet 86 while very heavy components are delivered through the outlet 88. This depends again on the setting of the equipment and the mode in which it is operated. Whether is operated with two or three outlets, suitable separation is obtained.

Attention is now directed to FIG. 6 of the drawings which shows an embodiment 90 which is quite similar to the system just described except that it includes two centrifuges deployed in series. The system 90 is otherwise similar except that the preliminary centrifuge 92 is a decanter centrifuge. A representative unit is described in pending application Ser. No. 060,046. In addition, the system incorporates a boiler 94 which provides heat for the several tanks. This assures that the temperatures are raised to the desired level. The outlet stream is tested in all points in time by a viscosity meter 96. Two parallel tanks are included at 22 and 98. By appropriate switching, they can handle flow on a continuous basis or by alternating, thereby operating in a batch basis. A representative dual centrifuge system is set forth in co-pending patent application Ser. No. 060,046 which was filed on Apr. 14, 1998. That disclosure is incorporated by reference. That disclosure is directed to a dual stage centrifuge system. It has the advantage of being a skid mounted structure. Hence, while heavy on the one hand, it is nevertheless portable because the size readily adapts to a flat bed skid which is easily moved. Just as the equipment shown in FIG. 6 is large but portable in the context, both the centrifuges and the membrane separator tube assembly mounted on the truck in FIG. 2 are movable. Just as readily, all this equipment can be fixed. Otherwise, the equipment can be located at a central collection point within trucking range of several plants. The plant liquor from several plants can be trucked to that location for treatment, reclamation, and ultimate return of the starch components.

One important aspect to the present disclosure is the relative ease of adjustment of the set points at which separation is accomplished. In general terms, this is accomplished for each of the two centrifuges and the membrane. Nevertheless, the set points for separation are coordinated so that excessive dwell time is not required in any of the three. It is especially important to adjust this so that the through put of each matches the others so that no one stage becomes a bottleneck in operation. All the while, the system is operated as a system so that the three particular separation stages are integrated. To this end, FIG. 1 includes the many valves provided with valve operators. The CPU 70 provides control signals to the several valve operators which are connected to the valves. In the particular embodiment shown in FIG. 6, many valves are included which operate in the same fashion. While they may differ in the setpoints applied to the individual valves, they all operate in the same fashion by signals provided to the valve operators. In this embodiment, each valve is provided with its own operator. The CPU 70 forms the appropriate set signals for the several valve operators. This enables the system to adjust each valve operator so that the flow through the system is appropriate. Appropriate sensors are located in the system as noted. Typically, the responsive sensors have inputs to the CPU 70.

IMPACT OF MEMBRANE LENGTH ON WASTE PURIFICATION

The present disclosure utilizes the membrane which has the form of the folded tube shown in FIG. 4. Briefly, the U-shaped tube 40 is folded any number of times for directing the waste stream through a series of the tubes. Since the tubes making up the membrane 40 come in a fixed and finite length, the total length is achieved simply by serially connecting the tubes together. As shown in FIG. 3 of the drawings, both input and output to the membrane tubes 40 are at the right hand end. A single pass of the waste stream is achieved on flow to the left and a second pass occurs with return back to the right hand end, just as shown in FIG. 4. If the tube 40 is 40 feet in length (approximately the maximum length suitable for the towed trailer), then the flow path for the tube shown in FIG. 4 is 80 feet (again assuming that the bend 46 is not porous). By forcing another trip through another U-shaped tube, the total length is increased is to 160 feet and even numbered multiples of 40 feet. This defines a series wherein N is an even numbered integer and is 2, 4, 6, 8 . . . .

FIG. 6 of the drawings shows the waste stream flowing through the first and second centrifuges. The last cut is achieved in the membrane system 32. The waste cut, however, from the membrane 32 is improved or enhanced by extending the length of the membrane. Using the above stated formula, if the membrane tube is 480 feet, or perhaps 640 feet, then the amount of solvent pulled from the waste stream is increased and a greater level of purification is obtained. Interestingly, if feedback occurs at that juncture, the length of the membrane tube can be decreased and yet the amount of waste removed by the centrifuges is increased. This feedback line 24 operates in conjunction with the two tanks. The feedback line is directed from the output of the membrane separator 32 to return the feedback to one. This feedback directs the flow out of the membrane separator 32 to the storage tank 22. Consider for the moment that 75% of the material output in the waste stream from the membrane separator is switched back through the feedback line. If that occurs, the gross waste output is actually reduced and the amount of waste output from the centrifuge 30 is increased.

By judicious adjustment of the feedback ratio coupled with increasing (or decreased) length of the membrane tube in the separator 32, the proportion of the waste material removed by the second centrifuge is increased. The portion removed by the membrane separator 32 is decreased. The feedback cycle just described enhances the removal accomplished at the second centrifuge. Moreover, earlier removal of waste prior to arriving at the membrane thereby reduces the total throughput of the membrane separator and reduces the utilities for operation. In effect, this connection with feedback enhances significantly production of the entire system at a lower cost.

As tube length is increased, greater length increases the relative portion of the waste that is segregated from the solvent by the membrane tube. With the feedback, however, the modest elongation of the membrane tube cooperates to make the centrifuge 30 more effective, thereby removing more of the waste at that stage, and producing a relatively clarified stream for the membrane separator 32. The feedback cycle will stabilize at appropriate flow rates and waste discharge rates for the second centrifuge and separately for the membrane separator. In general terms, more waste is delivered from the second centrifuge, thereby providing the membrane tube with a larger relative solvent flow in the remaining waste to assure that the flow velocity is maintained within the specified velocity limits.

The major material which is selectively removed includes starches and the like. These materials are characterized in that they do not easily come out merely by centrifuging; rather, they need to be modified at least somewhat in the membrane separator 32. Basically, the individual, generally unconsolidated starch molecules become more cohesive after passing through the membrane separator 32 and are then more readily removed in the second centrifuge 30.

MODIFIED BATCH OPERATION WITH FEEDBACK

Going now to FIG. 6 of the drawings, a modified batch operation is set forth. Initially, the description sets forth the centrifuge 30 and the two tanks which provides the flow for the centrifuge 24. By judicious control of the level in each tank, operation can be controlled readily. However, a modified mode of operation is well worth considering. Operation where the flow is directed through the first centrifuge, the second and then through the membrane separator will be deemed continuous flow processing. The process is modified by replicating the tank 22 with a second tank 98. With appropriate control valves, one or both of the tanks can be filled to a specified level. Operation of the system on a batch basis then proceeds as follows. Flow is introduced and ultimately delivered into the tank 22. The tank 22 is filled to a specified level and flow is then stopped. The tank 22 is then pumped to deliver flow through the centrifuge 24, and ultimately through the membrane separator 32. It is then delivered out of the membrane separator 32 and directed to the feedback line 24. The feedback returns the concentrate from the membrane separator 32. It is restored back to the tank 22. The tank is then refilled with the feedback flow.

As a specified quantity passes from the tank 22 and is cycled through the centrifuge and membrane separator, some portion of the solvent is recovered. Some portion of the starch and pulp material is segregated and removed. By appropriate operation, two or perhaps three passes will reduce the volume in the container 22, thereby ejecting both solvent and segregated materials, and thereby ending treatment of the batch. As discussed below, the batch can be terminated by obtaining a specified concentrate strength. Alternately, this batch approach can be applied first using one tank and then the other tank. By judicious timing of the operation of the input valves and valves in the feedback line 24, the feedback flow fills and refills the two tanks while processing continues. Even with starches, the segregation is enhanced so that a portion of the starch material is removed.

Controlled operation of the system, whether running in a continuous mode, or operating on a modified batch basis as just described, monitoring of the output stream can be accomplished easily by installing a viscosity meter 96 in the output line 90. Ordinarily, the output line 90 delivers the flow of concentrated solids and other materials with a minimum flow of solvent. The viscosity meter 96 is connected to the CPU 70 which in turn operates valve operators 72 to control the valves. The viscosity meter 96 is therefore used to determine the flow output, and is especially significant in observation of the viscosity, thereby reducing the amount of solvent which is wasted in the waste stream through the waste line 90. Accordingly, the viscosity meter forms a signal input through the CPU so that processing is repeated as necessary to recover more of the solvent, thereby raising the thickness or viscosity of the flow to a desired range. This is especially beneficial in terms of controlling the two types of separators.

The viscosity measurement triggers operation of the systems so that the starch components are removed typically at the first centrifuge, and somewhat less so at the second centrifuge, and the light weight components which are not so easily removed because of a lack of weight differential are then concentrated i.e. the starch molecules coagulate or agglomerate. Through this approach the materials removed by virtue of their greater density make up part of the waste stream through the waste line 90 and the large molecules of starch which do not have any weight differential are also removed. Moreover, solvent in the stream 90 is reduced.

If desired, the valve 96 can be closed so that the entire output of the membrane separator 32 is redirected through the feedback line, and the only waste outlet line is from the centrifuges 20 and 92. Generally, it is not necessary to measure the viscosity from the waste from the first centrifuge. Rather, the waste from the centrifuge 30 carries those components that are more difficult to separate.

MEMBRANE PORE SIZE

An important aspect of the present disclosure is matching the pore size of the membrane to the size of the molecules which make up the solvent. Generally speaking the pore size should be arranged so that the solvent molecules pass through readily. With pores of about one micron the molecules of water, diesel oil and synthetic oil pass readily through the membrane separator. In most instances, small molecules of salt in the solvent were also passed through. The size however excludes the heavier particles While the foregoing is directed to preferred embodiment, the scope thereof is determined by the claim which follow:

What is claimed is:

1. A separator for food starches comprising:

(a) serially connected first and second separators wherein said first separator comprises a centrifuge and said second separator comprises a membrane separator further comprising sintered pipe providing pore flow paths wherein said first and second separators are provided with food plant liquor for separation from the solvent therein;

(b) a pumped source providing at least a batch of food plant liquor input to the serially connected first and second separators;

(c) first and second separator outputs for delivery of segregated food starch from the food plant liquor; and (d) a control system to regulate the flow of food plant liquor through the first and second separators at a selected flow velocity of the liquor so that solvent is substantially purified and segregated from the food starches in the food plant liquor.

2. The apparatus of claim 1 wherein said second separator comprises:

(a) an elongate filter having a pair of separated surfaces with a sized set of pores therethrough to enable fluid flow through said filter to separate the food plant liquor into a solvent and separated solvent carried materials; and (b) an inlet and serially connected outlet communicating the food plant liquor into close contact with said filter so that said filter forms flows of separated solvent and separated food starches at the outlet.

3. The apparatus of claim 2 wherein said separated surfaces are concentric surfaces of an elongate pipe having an axial flow path therein.

4. The apparatus of claim 1 wherein said second separator comprises:

(a) an elongate porous membrane formed as a tube;

(b) a hollow elongate tubular housing supporting said tube;

(c) a portable mount for said tube and housing; and (d) inlet and outlet connections for said housing to enable said mount to be moved and connected after said mount is moved.

5. A separator for food starches comprising:

(a) serially connected first and second separators wherein said first separator comprises a centrifuge and said second separator comprises a membrane separator, and wherein said first and second separators are provided with food plant liquor for separation from the solvent therein, and wherein said second separator comprises (i) an elongate filter having a pair of separated surfaces with a sized set of pores therethrough to enable fluid flow through said filter to separate the food plant liquor into a solvent and separated solvent carried materials, (ii) an inlet and serially connected outlet communicating the food plant liquor into close contact with said filter so that said filter forms flows of separated solvent and separated food starches at the outlet, (iii) said separated surfaces are concentric surfaces of an elongate pipe having an axial flow path therein, and (iv) said elongate pipe comprises a porous, sintered pipe having a set of pores therethrough having a diameter sufficiently large to pass solvent in the food plant liquor and yet separate food starches in the food plant liquor;

(b) a pumped source providing at least a batch of food plant liquor input to the serially connected first and second separators;

(c) first and second separator outputs for delivery of segregated food starch from the food plant liquor; and (d) a control system to regulate the flow of food plant liquor through the first and second separators so that solvent is substantially purified and segregated from the food starches in the food plant liquor.

6. The separator of claim 5 wherein said elongate pipe comprises first and second paralleled pipe lengths which are parallel and are enclosed within a surrounding housing wherein said housing comprises an elongate larger pipe so that solvent flowing through said porous pipe passes through the wall thereof and flows into said outer pipe.

7. The separator of claim 6 wherein said outer pipe encloses at least 2 parallel segments of said porous elongate pipe, and wherein said porous elongate pipe is replicated to provide at least a pair of pipe segments therein and the number of segments is given by the relationship 2N where N is a whole number integer.

8. The separator of claim 7 wherein said pipe segments are connected serially with a U-shaped non porous connective, end located elbow which comprises a serial connection there between.

9. The apparatus of claim 5 wherein said first separator comprises a centrifuge forming an output of separated food starch components and a flow of food plant liquor solvent which solvent is input to an intermediate storage tank, and said storage tank has an output to process the solvent for subsequent separation.

10. The apparatus of claim 5 wherein said first separator comprises a disk centrifuge forming an output of segregated food starch components and a food plant liquor solvent which solvent is serially input to an intermediate storage tank, and said storage tank has an output to process the solvent for further separation.

11. The apparatus of claim 5 wherein said first and second separators are serially connected to first and second pumps and said first and second separators each segregate and separate heavier components in said food plant liquor, and also including first and second serially connected tanks to smooth the input to said first and second separators.

12. The apparatus of claim 11 wherein said second separator connects to said first separator with a feedback line.

13. The apparatus of claim 5 wherein said first separator comprises serially connected first and second centrifuges, serially connected first and second tanks, a serially connected pump for said centrifuges, and further including control valves serially connected to control the flow and including valve operators for said control valves so that the flow through said first and second centrifuges is regulated, and wherein each of said first and second centrifuges separates heavier weight components in said food plant liquor, and forms an output stream of the solvent from said food plant liquor which is input to said second separator.

14. The apparatus of claim 13 wherein said valve operators are operated by said flow control system.

15. The apparatus of claim 5 including a feedback line connected from the output of said second separator to feedback a portion of the food starch from said second separator for reprocessing in said first separator, thereby providing a feedback loop for at least that portion, and further wherein the portion provided through the feedback loop is reprocessed in said first separator.

16. The apparatus of claim 15 wherein said control system determines the portion of feedback and the feedback line directs that portion so that said first separator has two inputs and one of said inputs is said feedback portion.

* * * * *